(12) United States Patent
Tham et al.

(10) Patent No.: US 12,507,174 B2
(45) Date of Patent: *Dec. 23, 2025

(54) POWER OPTIMIZATION FOR COMPUTING DEVICES

(71) Applicant: Snap Inc., Santa Monica, CA (US)

(72) Inventors: Yu Jiang Tham, Los Angeles, CA (US); Andrés Monroy-Hernández, Princeton, NJ (US); Tsung-Yu Tsai, Bellevue, WA (US)

(73) Assignee: Snap Inc., Santa Monica, CA (US)

( * ) Notice: Subject to any disclaimer, the term of this patent is extended or adjusted under 35 U.S.C. 154(b) by 546 days.

This patent is subject to a terminal disclaimer.

(21) Appl. No.: 17/930,694

(22) Filed: Sep. 8, 2022

(65) Prior Publication Data
US 2023/0007593 A1 Jan. 5, 2023

Related U.S. Application Data

(63) Continuation of application No. 16/948,628, filed on Sep. 25, 2020, now Pat. No. 11,445,444.

(51) Int. Cl.
H04W 52/02 (2009.01)
H04W 4/02 (2018.01)
(Continued)

(52) U.S. Cl.
CPC ....... *H04W 52/0274* (2013.01); *H04W 4/023* (2013.01); *H04W 4/12* (2013.01); *H04W 4/80* (2018.02)

(58) Field of Classification Search
CPC ... H04W 52/0274; H04W 4/80; H04W 4/023; H04W 4/12
See application file for complete search history.

(56) References Cited

U.S. PATENT DOCUMENTS

| 7,925,212 B2 | 4/2011 | Eisenbach |
| 10,334,397 B2 | 6/2019 | Alharayeri |

(Continued)

FOREIGN PATENT DOCUMENTS

| CN | 109074572 A | 12/2018 |
| KR | 20130105467 | 9/2013 |

(Continued)

OTHER PUBLICATIONS

"U.S. Appl. No. 16/948,628, 312 Amendment filed Jul. 22, 2022", 7 pgs.

(Continued)

*Primary Examiner* — Steven S Kelley
(74) *Attorney, Agent, or Firm* — Schwegman Lundberg & Woessner, P.A.

(57) ABSTRACT

The technical problem of optimizing power consumption of paired user devices is addressed by disabling and resuming short range wireless communication components of the paired user devices. The disabling and resuming of the short range wireless communication components may be determined based on a comparison of a distance between the paired user devices and a threshold distance. The threshold distance may be adjusted by a machine learning model according to user profiles associated with the paired user devices. The distance between the paired user devices may be determined based on location data of the paired user devices. The location data may be obtained by global positioning systems (GPS) mounted on the paired user devices. The location data may be communicated between the paired user devices via a messaging server.

16 Claims, 7 Drawing Sheets

(51) Int. Cl.
*H04W 4/12* (2009.01)
*H04W 4/80* (2018.01)

(56) References Cited

U.S. PATENT DOCUMENTS

| | | | |
|---|---|---|---|
| 10,433,110 B1* | 10/2019 | Bergerhouse | H04B 17/318 |
| 10,721,609 B1* | 7/2020 | Blythe | H04W 4/90 |
| 11,139,858 B1* | 10/2021 | Covell | H04W 4/38 |
| 11,445,444 B2* | 9/2022 | Tham | H04W 52/0274 |
| 2005/0281237 A1 | 12/2005 | Heinonen et al. | |
| 2006/0063548 A1 | 3/2006 | Kim | |
| 2009/0209202 A1 | 8/2009 | Martini et al. | |
| 2011/0234399 A1 | 9/2011 | Yan | |
| 2013/0173455 A1* | 7/2013 | Adams | H04B 5/00 455/41.1 |
| 2014/0201266 A1 | 7/2014 | Jackson et al. | |
| 2015/0004912 A1* | 1/2015 | Diamond | H04W 4/023 455/41.2 |
| 2015/0141060 A1* | 5/2015 | Shan | H04W 4/21 455/566 |
| 2016/0078742 A1 | 3/2016 | Fernandez et al. | |
| 2016/0162586 A1 | 6/2016 | Maxwell et al. | |
| 2017/0171710 A1* | 6/2017 | Rothert | H04W 48/04 |
| 2017/0339771 A1* | 11/2017 | Liu | H04W 48/10 |
| 2018/0062851 A1* | 3/2018 | Cronholm | H04W 12/06 |
| 2021/0083786 A1 | 3/2021 | Nehls et al. | |
| 2022/0104136 A1 | 3/2022 | Tham et al. | |

FOREIGN PATENT DOCUMENTS

| | | |
|---|---|---|
| KR | 20160138524 A | 12/2016 |
| WO | WO-2022066409 A1 | 3/2022 |

OTHER PUBLICATIONS

"U.S. Appl. No. 16/948,628, Appeal Brief filed Apr. 14, 2022", 16 pgs.

"U.S. Appl. No. 16/948,628, Decision on Pre-Appeal Brief Request for Review mailed Mar. 1, 2022", 2 pgs.

"U.S. Appl. No. 16/948,628, Examiner Interview Summary mailed Oct. 20, 2021", 2 pgs.

"U.S. Appl. No. 16/948,628, Final Office Action mailed Nov. 16, 2021", 13 pgs.

"U.S. Appl. No. 16/948,628, Non Final Office Action mailed Jul. 28, 2021", 13 pgs.

"U.S. Appl. No. 16/948,628, Notice of Allowance mailed May 2, 2022", 15 pgs.

"U.S. Appl. No. 16/948,628, Pre-Appeal Brief Request for Review filed Feb. 15, 2022", 5 pgs.

"U.S. Appl. No. 16/948,628, PTO Response to Rule 312 Communication mailed Jun. 29, 2022", 2 pgs.

"U.S. Appl. No. 16/948,628, Response filed Oct. 28, 2021 to Non Final Office Action mailed Jul. 28, 2021", 10 pgs.

"International Application Serial No. PCT/US2021/049366, International Search Report mailed Dec. 3, 2021", 5 pgs.

"International Application Serial No. PCT/US2021/049366, Written Opinion mailed Dec. 3, 2021", 7 pgs.

"European Application Serial No. 21794668.0, Communication Pursuant to Article 94(3) EPC mailed Mar. 14, 2024", 5 pgs.

"International Application Serial No. PCT/US2021/049366, International Preliminary Report on Patentability mailed Apr. 6, 2023", 9 pgs.

"Korean Application Serial No. 10-2023-7013321, Notice of Preliminary Rejection mailed Feb. 5, 2025", w/ English translation, 10 pgs.

"Chinese Application Serial No. 202180065099.1, Office Action mailed May 30, 2025", w/ English Translation, 21 pgs.

"Korean Application Serial No. 10-2023-7013321, Notice of Preliminary Rejection mailed May 1, 2025", w/ English translation, 9 pgs.

"Korean Application Serial No. 10-2023-7013321, Response Filed Apr. 7, 2025 to Notice of Preliminary Rejection mailed Feb. 5, 2025", w/ English Claims, 23 pgs.

"Korean Application Serial No. 10-2023-7013321, Notice of Preliminary Rejection mailed Aug. 1, 2025", w/ English translation, 7 pgs.

\* cited by examiner

POWER OPTIMIZATION FOR COMPUTING DEVICES

CROSS-REFERENCE TO RELATED APPLICATION

This application is a continuation of U.S. patent application Ser. No. 16/948,628, filed Sep. 25, 2020, and entitled "POWER OPTIMIZATION FOR CO-LOCATION CONNECTION SERVICE." The above application is incorporated by reference herein.

TECHNICAL FIELD

The present disclosure relates generally to facilitating interactions between devices hosting a messaging application.

BACKGROUND

The popularity of computer-implemented tools that permit users to access and interact with content and other users online continues to grow. For example, various computer-implemented tools exist that permit users to share content with other users through messaging applications or to play with other users online in multiplayer video games. Some of such computer-implemented tools, termed applications or apps, can be designed to run on a mobile device such as a phone, a tablet, or a watch. Mobile devices can be configured to communicate over the Internet, as well as over short range wireless communication technology, such as, e.g., Bluetooth®. A Bluetooth® sensor, when enabled on a mobile device, scans for other Bluetooth®-enabled devices and, also, advertises its presence to other Bluetooth-enabled devices. A user can manually disable Bluetooth® scanning and advertising, as well as to manually re-enable Bluetooth® scanning and advertising, based on the user's needs for short range wireless communication.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
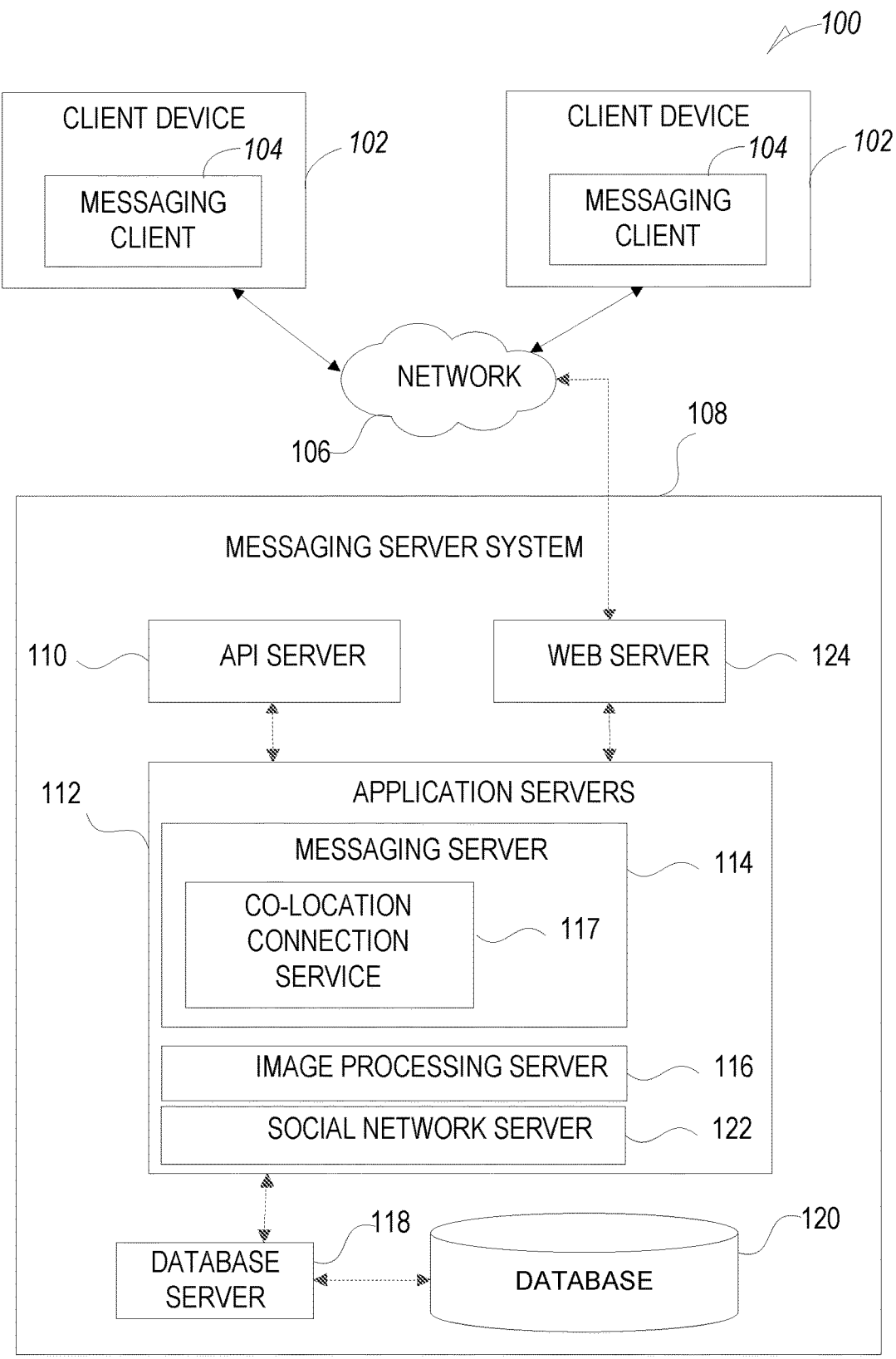
FIG. 1 is a diagrammatic representation of a networked environment in which a power optimization for co-location connection service may be deployed, in accordance with some examples.

A co-location connection service, which is accessible from client devices via a messaging client, is an online service that can be utilized to detect a co-location event indicating that two devices executing respective messaging clients are located within a certain physical proximity and to respond to the co-location event by unlocking one or more user experiences previously designated as co-location experiences. An example of a co-location experience is a modification of the user interface to include an indication of co-location of the devices, a visual control actionable to activate a mini app or a game that is not otherwise made available to the users, an animated image with a transparent background, e.g., of a couple engaged in an activity that in non-virtual realm is only possible when two people are in close proximity, such as hugging or dancing, etc. A co-location event is detected based on information obtained using short range wireless communication component provided at the client devices.

The co-location connection service and the messaging client are provided by a messaging server system that maintains user profiles representing users of the co-location connection service. The co-location connection service is configured to selectively pair user profiles associated with respective client devices that can communicate with each other within a predetermined physical range, termed co-location distance for the purposes of this description, using short range wireless communication component. The client devices associated with respective paired user profiles are referred to as paired client devices. The operation of short range wireless communication component by a client device includes advertising the presence of the device to the paired device and/or scanning operation to discover the presence of the paired device within the communication range of the short range wireless communication component. The short range wireless communication component may utilize short range wireless communication technology, such as, e.g., Near Field Communication (NFC), Bluetooth® (e.g., Bluetooth® Low Energy), a low frequency audio signal, radio-frequency identification (RFID), etc.

The process of advertising and scanning at the paired client devices, by the short range wireless communication component, is referred to as co-location detection. Continuous operation of the short range wireless communication component by a client device for the purpose of co-location detection requires expenditure of power resources. The availability of power resources, especially at a mobile device, may be limited.

The technical problem of reducing power consumption of paired client devices is addressed by providing a power optimization component in the messaging client executing at a paired client device. The power optimization component periodically queries location services available at its host paired client device to obtain location data indicating geographic location of the paired client device. The power optimization component communicates the obtained location data to the other paired client device. The power optimization component also receives location data indicating geographic location of the other paired client device. The power optimization component uses the location data indicating the geographic location of its host paired client device and the location data indicating the geographic location of the other paired client device to detect an optimization trigger event. The optimization trigger event indicates that the physical distance between the paired client devices is greater than a certain predetermined distance termed threshold distance for the purposes of this description. The threshold distance is greater than the co-location distance and, also, is great enough so that it can be inferred that the paired devices will not be within a co-location distance in the immediate future. The threshold distance may be a specified distance (e.g., a mile, or five miles, or three hundred feet). In some examples, the threshold distance may be periodically determined for paired client devices based on rules or using a predictive machine learning model that takes, as input, features indicative of behavior of the users, represented by respective paired user profiles, operating the respective paired client devices (e.g., features indicative of interactions with the collocation communication service of respective users represented by the first user profile and the second user profile). In response to detecting the optimization trigger event, the power optimization component disables co-location detection at its host paired client device.

The power optimization component also uses the location data indicating the geographic location of its host paired client device and the location data indicating the geographic location of the other paired client device to detect a further optimization trigger event that indicates that the physical distance between the paired client devices is less than the threshold distance. In response to the further optimization trigger event, the power optimization component resumes co-location detection at its host paired client device. Examples of location services are the global positioning system (GPS) or a locating technology that uses relative network signal strength detected at network access points.

The paired client devices exchange their location data using the messaging server. For example, the messaging server may include a location data exchange component that receives location data from a paired client device and sends it to the other paired client device. The other paired client device receives the location data of is paired client device from the location data exchange component of the messaging server. While the power optimization methodology that uses location data obtained from location services, such as GPS, to determine whether to disable or to resume operation of short range wireless communication component, such as a Bluetooth® component is described in the context of co-location connection service, it can be used to reduce power consumption of paired devices that can communicate using short range wireless communication technology and that also have location detection capability, such as GPS sensors. The online power optimization for co-location connection service may be implemented in a networked computing environment, referred to as a messaging system, which is described with reference to FIG. 1 below.

Network Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data). A client device hosting a messaging client 104 may be equipped with sensors—short range wireless communication components—permitting the messaging client 104 to communicate and exchange data with another messaging client 104 over a short range wireless communication technology, such as, e.g., Bluetooth® Low Energy technology.

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, user device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as records related to changes made by the user to their profile data. Where a first user profile and a second user profile have been designated as paired user profiles, the first user profile includes a unique identification of the user's client device and an identification of the second user profile. The second user profile, in turn, includes a unique identification of their client device and an identification of the first user profile.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server 114. The social network server 122 supports various social networking functions and services and makes these functions and services available to the messaging server 114. The messaging server 114 provides an online power optimization for co-location connection service 117 configured to selectively pair user profiles associated with respective client devices equipped with sensors that communicate with each other within the predetermined physical range, monitor physical proximity of the client devices based on the sensor data obtained by the power optimization for co-location connection service from the respective messaging clients executing at the respective client devices and, in response to detecting that the client devices are within a predetermined physical proximity range, generates co-location experience by modifying the user interface in the respective messaging clients. The messaging server 114 is configured to cooperate with the messaging client 104 to optimize power consumption at the client devices 102 attributed to the use of short range wireless communication components, as is described in further detail below.

System Architecture

Figure 2:
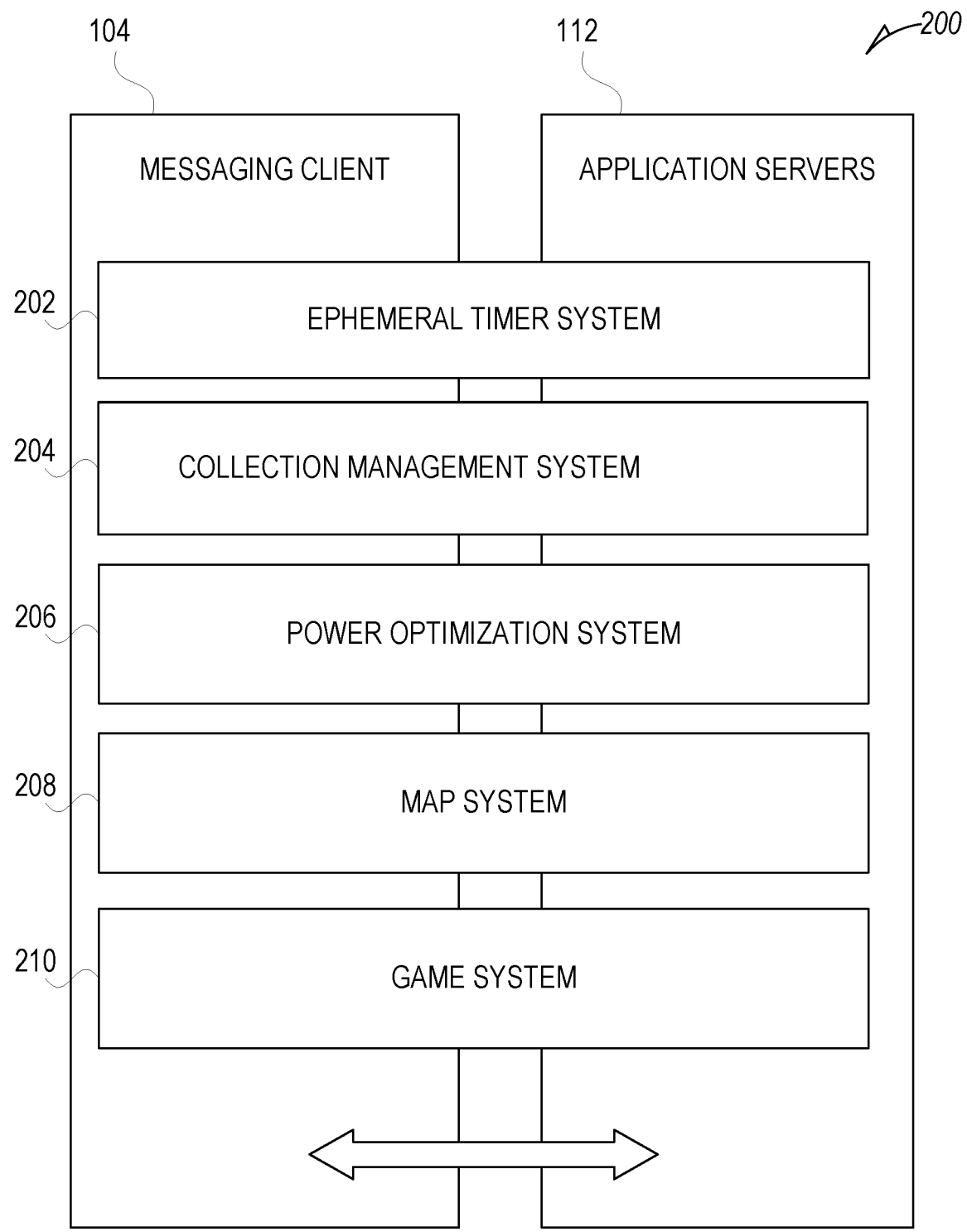
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and, also, supports the provision of in-game rewards (e.g., coins and items).

Figure 6:
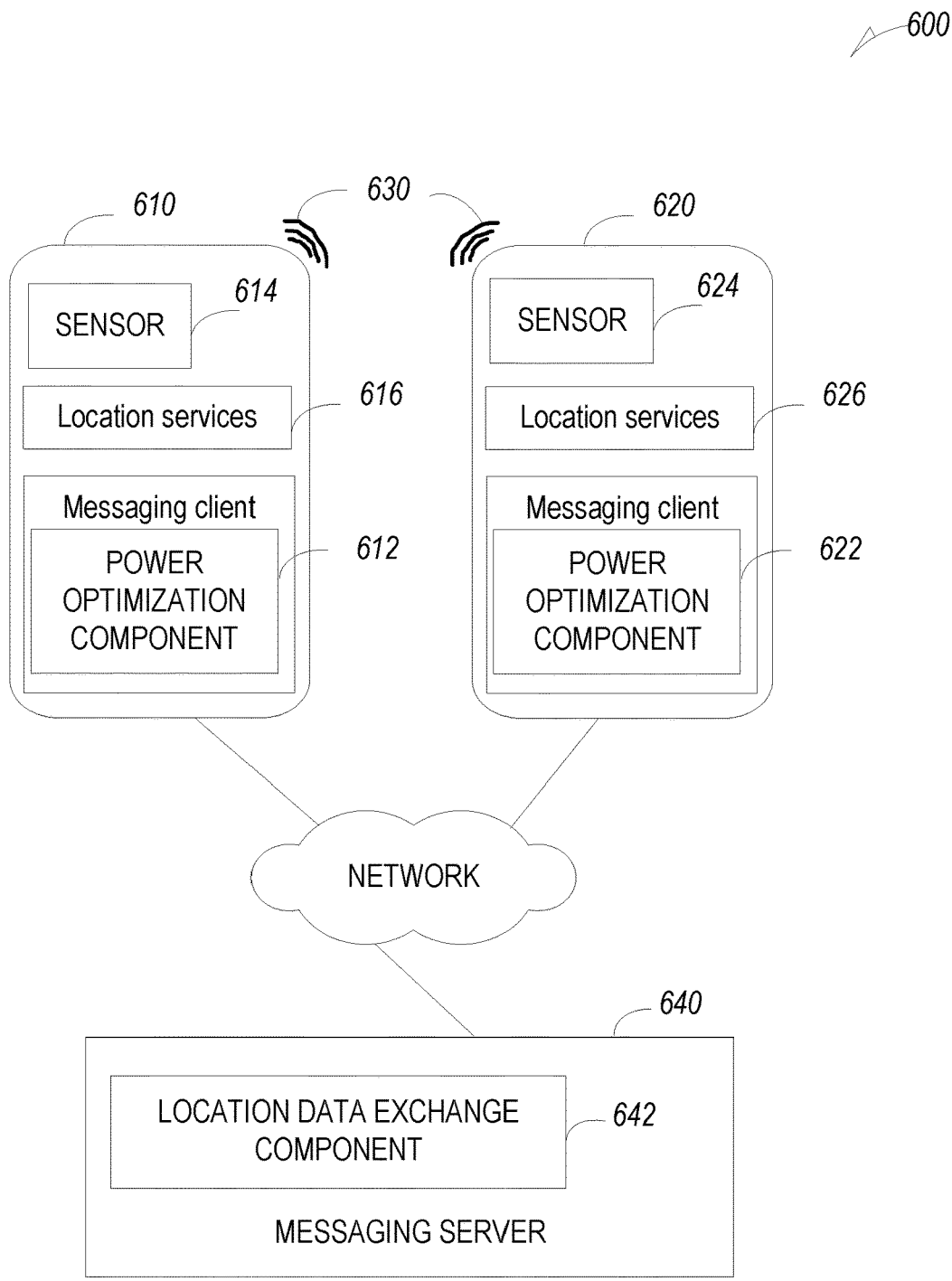
FIG. 6 is a diagrammatic representation of an example architecture comprising client devices that include a power optimization component.

Also shown in FIG. 2 is a power optimization system 206. The power optimization system 206 facilitates reduction of power consumption at a client device by selectively disabling operation of short range wireless communication component, e.g., disabling scanning and advertising performed by a Bluetooth® sensor, based on the physical distance between a client device and its paired device. The physical distance between the client device and its paired device is determined using location services (e.g., GPS) provided at the respective paired devices. The power optimization system 206 facilitates communication of location data of the paired client devices between the paired client devices via a messaging server, using a location data exchange component, which is illustrated in FIG. 6. The power optimization system 206 also uses components that reside at the paired client devices. These components include a short range wireless communication component, location services, and a power optimization component, which are discussed in further detail with reference to FIG. 4. As stated above, the paired client devices are the client devices associated with respective paired user profiles. A paired user profile, in addition to other profile information, such as a user identification, various user preferences, etc., includes a unique identification of the user's client device and an identification of the paired user profile.

Data Architecture

Figure 3:
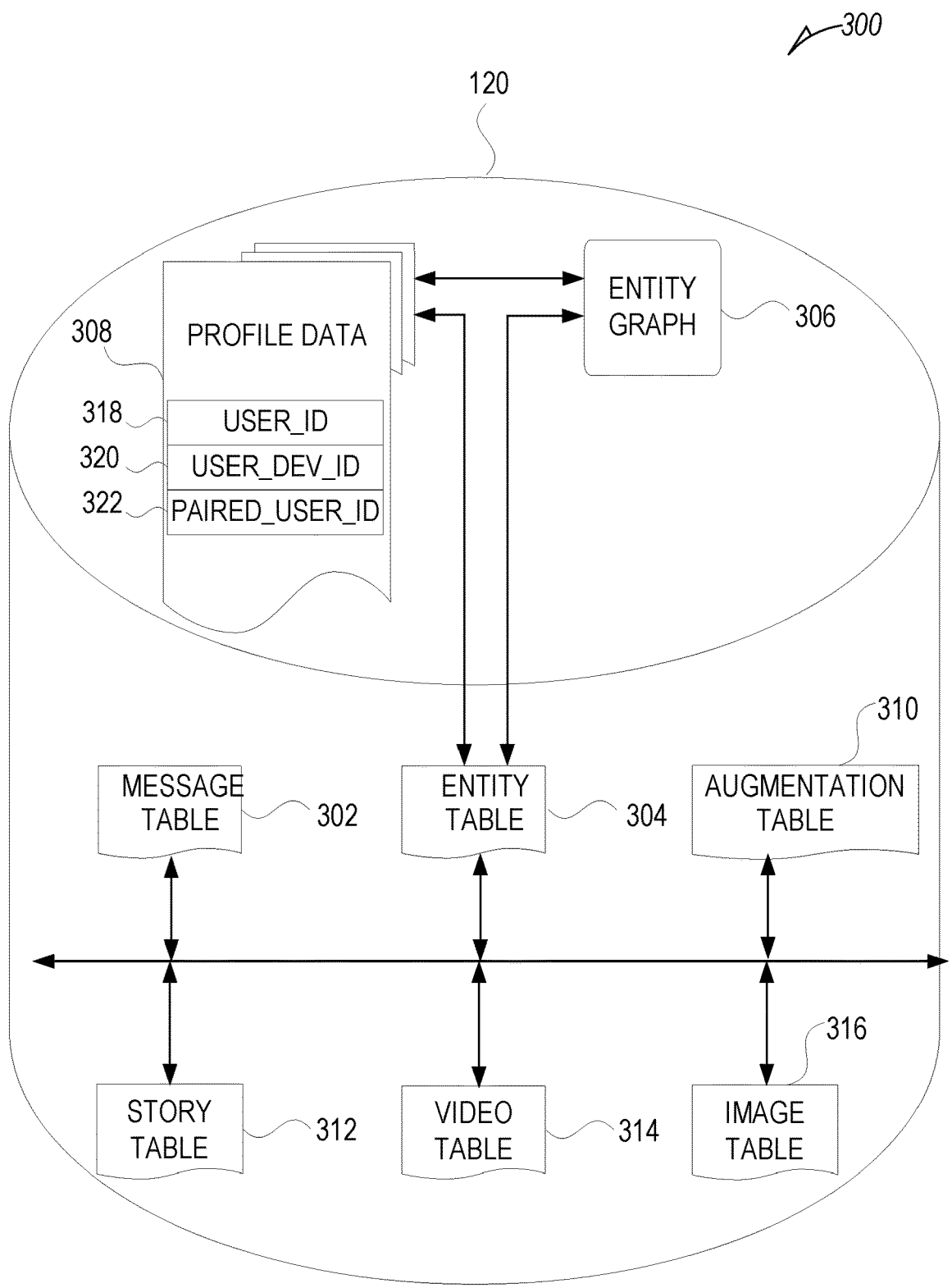
FIG. 3 is a diagrammatic representation of a data structure as maintained in a database, in accordance with some examples.

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. The entity graph 306 may also store information reflecting the pairing of user profiles representing users of the co-location service 117 of FIG. 1.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time. The profile data 308 that represents a profile paired with another user profile, where the paired profiles represent users of the co-location connection service 117, include, in addition to a user identification 318, a user device identification 320 and a paired user identification 322. In one example, given a user profile that includes a user identification, a user device identification and a paired user identification, the location data exchange component of the power optimization system 206 shown in FIG. 2 obtains location data of a user device (represented by the user device identification), determines the paired profile based on the paired user identification, and communicates the obtained location data of the user device to the paired device represented by a user device identification stored in the paired profile.

The database 120 also stores augmentation data, such as overlays or filters, in an augmentation table 310. The augmentation data is associated with and applied to videos (for which data is stored in a video table 314) and images (for which data is stored in an image table 316).

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Figure 4:
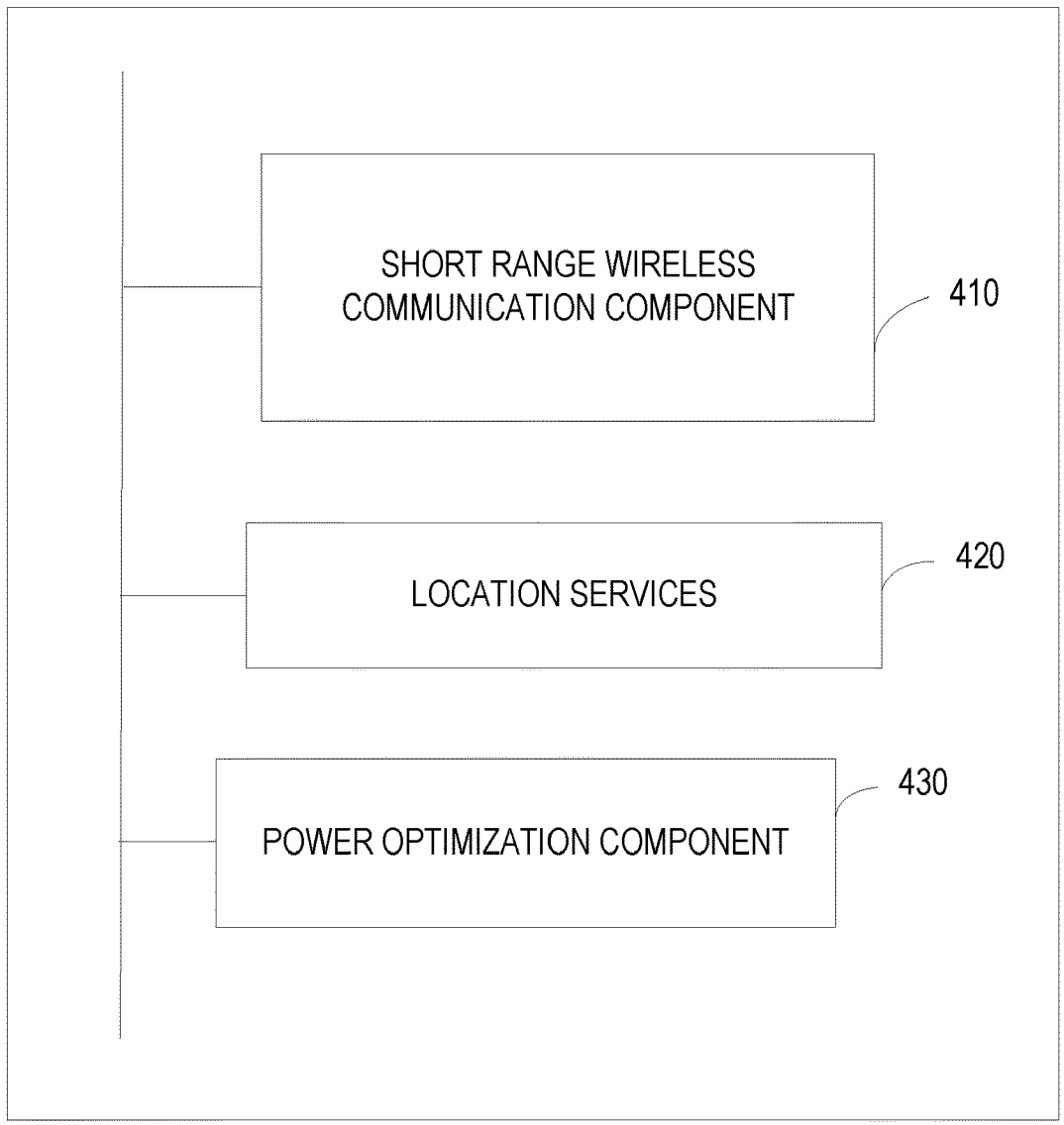
FIG. 4 is a block diagram of an architecture of a system for providing power optimization for co-location connection service, in accordance with some examples.

FIG. 4 is a block diagram illustrating an example system 400 for providing power optimization for co-location connection service. The system 400 includes a short range wireless communication component 410, location services 420, and a power optimization component 430. As described above, the operation of short range wireless communication component 410 by a client device may include advertising the presence of the client device and scanning operation to discover the presence of the paired device within the communication range of the short range wireless communication component 410. The short range wireless communication component 410 may utilize short range wireless communication technology, such as, e.g., Near Field Communication (NFC), Bluetooth® (e.g., Bluetooth® Low Energy), a low frequency audio signal, radio-frequency identification (RFID), etc. Examples of the location services 420 are the global positioning system (GPS) or a locating technology that uses relative network signal strength detected at network access points. The power optimization component 430 is configured to periodically query the location services 420 to obtain location data indicating geographic location of the client device and to communicate the obtained location data to the paired client device via a server system. The power optimization component 430 is also configured to receive location data indicating geographic location of the other paired client device and use the location data indicating the geographic location of the client device and the location data indicating the geographic location of the paired client device to detect an optimization trigger event indicating that the physical distance between the paired client devices is greater than the threshold distance. In response to detecting the optimization trigger event, the power optimization component 430 disables operation of the short range wireless communication component 410 at the client device. The power optimization component 430 is also configured to enable operation of the short range wireless communication component 410 at the client device in response to determining, based on the location data indicating the geographic location of the client device and the location data indicating the geographic location of the paired client device, that the physical distance between the paired client devices is less than the threshold distance. Each of the various components of the system 400 may be provided at the client device 102 of FIG. 1. Further details regarding the operation of a system 400 are described below.

Figure 5:
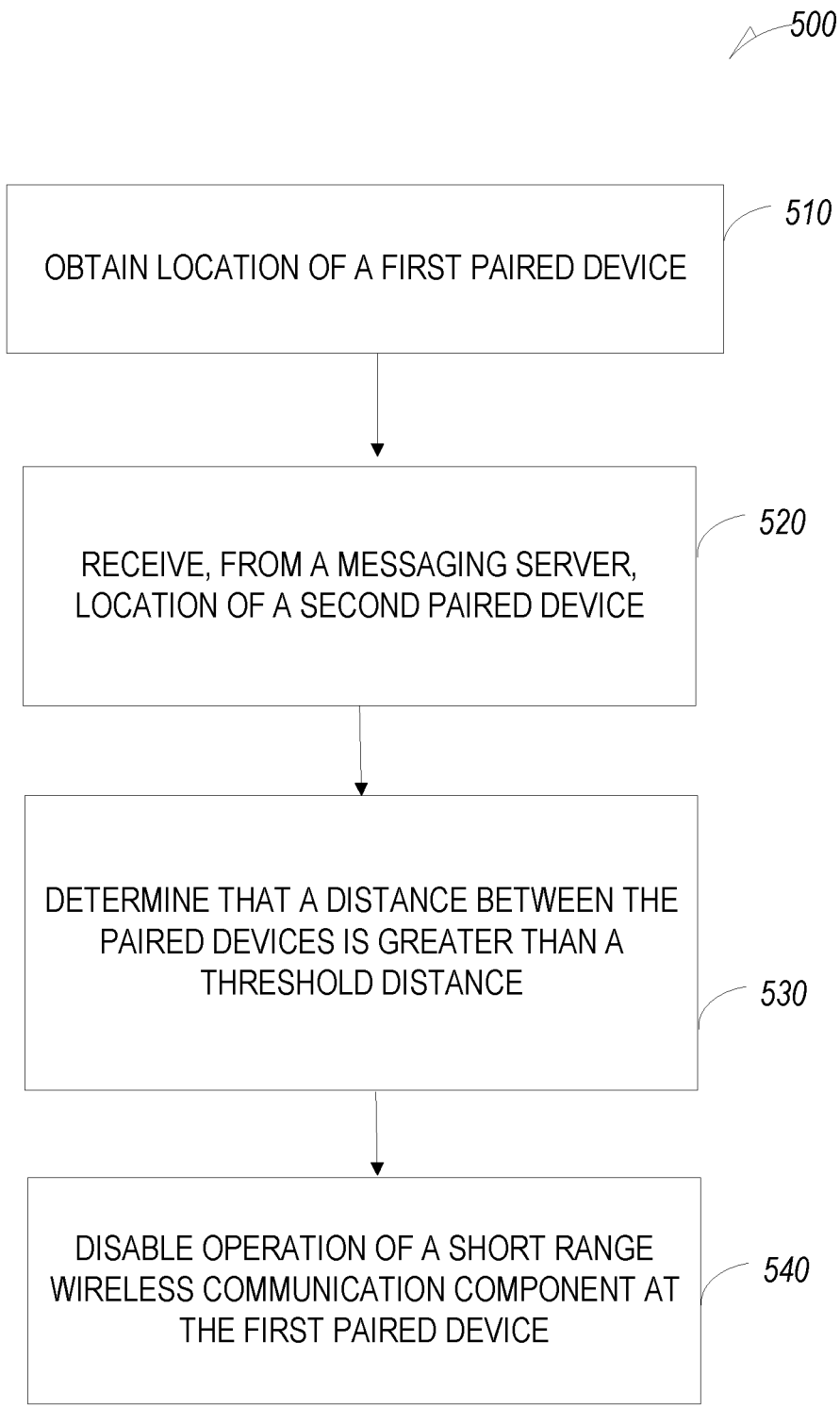
FIG. 5 is a flowchart of a method for providing power optimization for co-location connection service, in accordance with some examples.

FIG. 5 is a flowchart of a method 500 for providing power optimization for co-location connection service. The method 500 may be performed by processing logic that may comprise hardware (e.g., dedicated logic, programmable logic, microcode, etc.), software, or a combination of both. In one example, some or all processing logic resides at the client device 102 of FIG. 1 and/or at the messaging server system 108 of FIG. 1. Operation 510 comprises, at a first paired client device, from location services executing at the paired client device, obtaining first location data indicating geographic location of the first paired client device. Operation 520 comprises receiving, from a messaging server, second location data indicating geographic location of a second paired client device. Operation 530 comprises, based on the first location data and the second location data, determining that a distance between the first paired client device and the second paired client device is greater than a threshold distance. Operation 540 comprises, in response to the determining, disabling, operation of a short range wireless communication component at the first paired client device, the short range wireless communication component configured to exchange communications with the second paired client device within a co-location distance.

FIG. 6 is a diagrammatic representation 600 of an example architecture comprising client devices that include a power optimization component. As shown in FIG. 6, paired client devices 610 and 620 host respective messaging clients that include respective power optimization components 612 and 622, respective short range wireless communication components (sensors 614 and 624) that communicate via a signal 630, and respective location services 616 and 626.

The power optimization components 612 and 622 are configured, as described with reference to FIG. 2, to periodically query the respective location services 612 and 622 to obtain location data indicating geographic location of the paired client devices 610 and 620 and to communicate the obtained location data from one paired client device to the other client device via a location data exchange component 642 provided at a messaging server 640. The messaging server 640 uses the location data exchange component 642 to receive location data from a paired client device 610 and to send it to the other paired client device 620.

Machine Architecture

Figure 7:
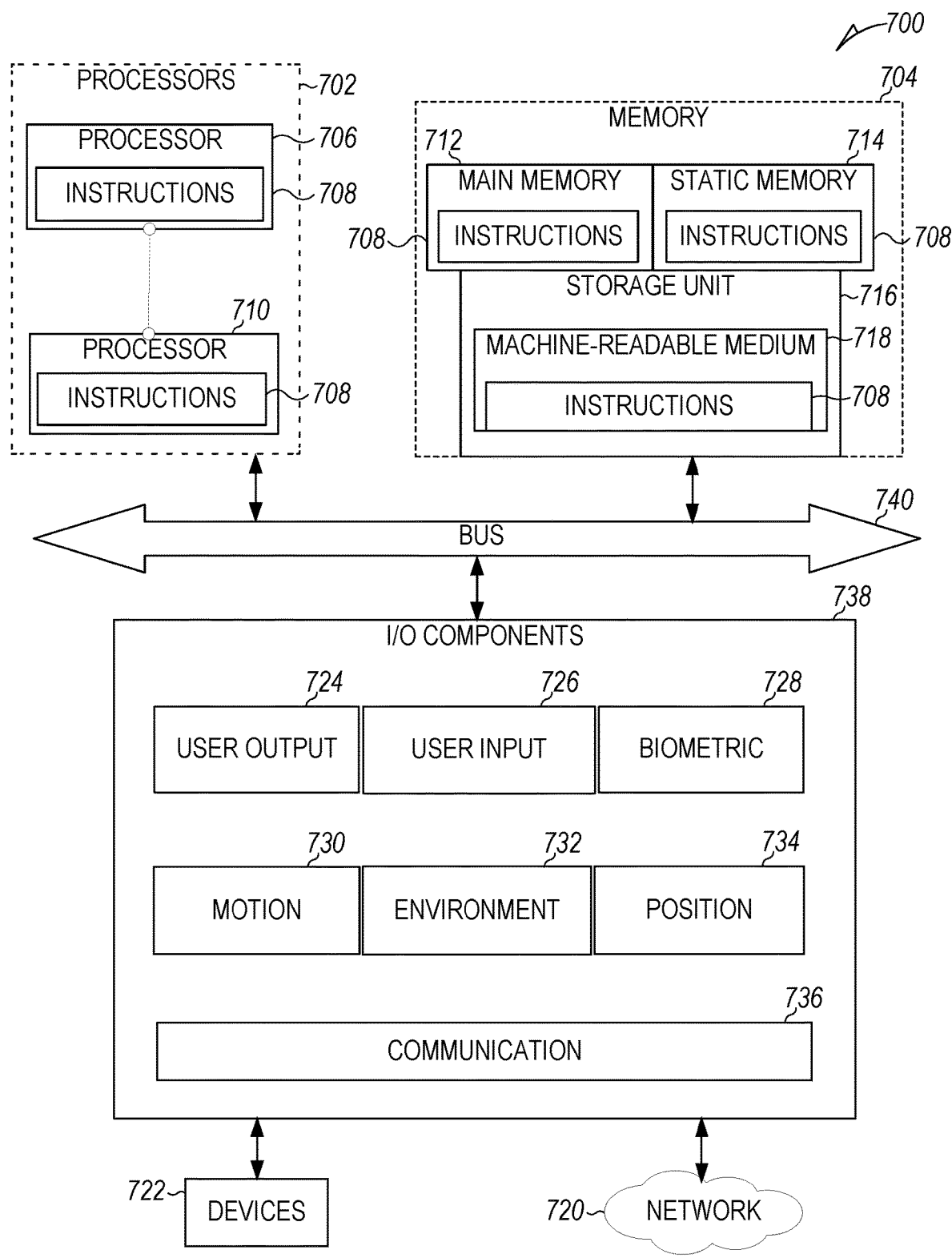
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 608 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein. The machine 700, for example, may comprise the client device 102 or any one of a number of server devices forming part of the messaging server system 108. In some examples, the machine 700 may also comprise both client and server systems, with certain operations of a particular method or algorithm being performed on the server-side and with certain operations of the particular method or algorithm being performed on the client-side.

The machine 700 may include processors 702, memory 704, and input/output I/O components 738, which may be configured to communicate with each other via a bus 740. In an example, the processors 702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single-core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 740. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the Processor's cache memory), or any suitable combination thereof, during execution thereof by the machine 700.

The I/O components 738 may include a wide variety of components to receive input, provide output, produce output, transmit information, exchange information, capture measurements, and so on. The specific I/O components 738 that are included in a particular machine will depend on the type of machine. For example, portable machines such as mobile phones may include a touch input device or other such input mechanisms, while a headless server machine will likely not include such a touch input device. It will be appreciated that the I/O components 738 may include many other components that are not shown in FIG. 7. In various examples, the I/O components 738 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 738 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 738 further include communication components 736 operable to couple the machine 700 to a network 720 or devices 722 via respective coupling or connections. For example, the communication components 736 may include a network interface Component or another suitable device to interface with the network 720. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 712, static memory 714, and memory of the processors 702) and storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed examples.

The instructions 708 may be transmitted or received over the network 720, using a transmission medium, via a network interface device (e.g., a network interface component included in the communication components 736) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 722.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   obtaining, from location services executing at a first paired user device, first location data indicating geographic location of the first paired user device, the first paired user device comprising a short range wireless communication component to exchange communications with a second paired user device within a predetermined distance;
   receiving, from a messaging server, second location data indicating geographic location of the second paired user device;
   receiving, from the first paired user device and the second paired user device, features indicative of user behaviors associated with the first paired user device and the second paired user device;
   inputting the received features including connectivity behaviors with a co-location communication service of the first paired user device and the second paired user device into a machine learning model,
   determining a threshold distance value using the machine learning model based on the inputted features indicative of the user connectivity behaviors,
   receiving an output comprising the threshold distance value from the machine learning model,
   determining, based on the first location data and the second location data, that a device distance value between the first paired user device and the second paired user device is greater than the threshold distance value; and
   in response to the determination that the device distance value is greater than the threshold distance value, disabling the short range wireless communication component at the first paired user device.

2. The method of claim 1, further comprising:
   determining that the distance between the first paired user device and the second paired user device is less than the threshold distance; and
   in response to the determining that the distance between the first paired user device and the second paired user device is less than the threshold distance, resuming the short range wireless communication component at the first paired user device.

3. The method of claim 2, further comprising:
   in response to the determining that the distance between the first paired user device and the second paired user device is less than the threshold distance,
   modifying a user interface of the first paired user device to present a predetermined of the first paired user device and the second paired user device.

4. The method of claim 1, wherein the threshold distance is periodically determined based on a rule.

5. The method of claim 1, wherein the threshold distance is greater than the predetermined distance.

6. The method of claim 1, wherein to exchange the communications with the second paired user device, the short-range wireless communication component is configured to perform operations comprising:
   advertising a presence of the first paired user device to the second paired user device; or
   discovering a presence of the second paired user device within a communication range of the short range wireless communication component.

7. The method of claim 6, wherein the disabling of the operation of the short range wireless communication component comprises:
   selectively disabling the advertising of the presence of the first paired user device or the discovering of the presence of the second paired user device.

8. The method of claim 1, wherein the receiving of the second location data comprises:
- obtaining, by the messaging server, a paired profile;
- obtaining, by the messaging server, the second location data of the second paired user device;
- determining, by the messaging server, the first paired user device represented by a user device identification stored in the paired profile; and
- communicating, by the messaging server, the obtained second location data of the second paired user device to the first paired user device.

9. The method of claim 1, wherein the short-range wireless communication component utilizes a low-frequency audio signal, Near Field Communication (NFC), Bluetooth, or radio-frequency identification (RFID).

10. A system comprising:
- one or more processors; and
- a non-transitory computer readable storage medium comprising instructions that when executed by the one or processors cause the one or more processors to perform operations comprising:
  - obtaining, from location services executing at a first paired user device, first location data indicating geographic location of the first paired user device, the first paired user device comprising a short range wireless communication component to exchange communications with a second paired user device within a predetermined distance;
  - receiving, from a messaging server, second location data indicating geographic location of the second paired user device;
  - receiving, from the first paired user device and the second paired user device, features indicative of user behaviors associated with the first paired user device and the second paired user device;
  - inputting the received features including connectivity behaviors with a co-location communication service of the first paired user device and the second paired user device into a machine learning model,
  - determining a threshold distance value using the machine learning model based on the inputted features indicative of the user connectivity behaviors,
  - receiving an output comprising the threshold distance value from the machine learning model,
  - determining, based on the first location data and the second location data, that a device distance value between the first paired user device and the second paired user device is greater than the threshold distance value; and
  - in response to the determination that the device distance value is greater than the threshold distance value, disabling the short range wireless communication component at the first paired user device.

11. The system of claim 10, wherein the instructions further cause the one or more processors to perform operations comprising:
- determining that the distance between the first paired user device and the second paired user device is less than the threshold distance; and
- in response to the determining that the distance between the first paired user device and the second paired user device is less than the threshold distance, resuming the operation of the short range wireless communication component at the first paired user device.

12. The system of claim 11, wherein the instructions further cause the one or more processors to perform operations comprising:

- in response to the determining that the distance between the first paired user device and the second paired user device is less than the threshold distance,
- modifying a user interface of the first paired user device to include a predetermined of the first paired user device and the second paired user device.

13. The system of claim 10, wherein to exchange the communications with the second paired user device, the short-range wireless communication component is configured to perform operations comprising:
- advertising a presence of the first paired user device to the second paired user device; or
- discovering a presence of the second paired user device within a communication range of the short range wireless communication component.

14. The system of claim 13, wherein the disabling of the operation of the short range wireless communication component comprises:
- selectively disabling the advertising of the presence of the first paired user device or the discovering of the presence of the second paired user device.

15. The system of claim 10, wherein the receiving of the second location data comprises:
- obtaining, by the messaging server, a paired profile;
- obtaining, by the messaging server, the second location data of the second paired user device;
- determining, by the messaging server, the first paired user device represented by a user device identification stored in the paired profile; and
- communicating, by the messaging server, the obtained second location data of the second paired user device to the first paired user device.

16. A machine-readable non-transitory storage medium having instruction data executable by a machine to cause the machine to perform operations comprising:
- obtaining, from location services executing at a first paired user device, first location data indicating geographic location of the first paired user device, the first paired user device comprising a short range wireless communication component to exchange communications with a second paired user device within a predetermined distance;
- receiving, from a messaging server, second location data indicating geographic location of the second paired user device;
- receiving, from the first paired user device and the second paired user device, features indicative of user behaviors associated with the first paired user device and the second paired user device;
- inputting the received features including connectivity behaviors with a co-location communication service of the first paired user device and the second paired user device into a machine learning model,
- determining a threshold distance value using the machine learning model based on the inputted features indicative of the user connectivity behaviors,
- receiving an output comprising the threshold distance value from the machine learning model,
- determining, based on the first location data and the second location data, that a device distance value between the first paired user device and the second paired user device is greater than the threshold distance value; and
- in response to the determination that the device distance value is greater than the threshold distance value, disabling the short range wireless communication component at the first paired user device.

\* \* \* \* \*